US012605697B1

(12) United States Patent
Abdulkhair et al.

(10) Patent No.: US 12,605,697 B1
(45) Date of Patent: Apr. 21, 2026

(54) PALLADIUM/PALLADIUM OXIDE/CALCIUM SILICATE/GRAPHITIC CARBON NITRIDE NANOCOMPOSITE MATERIAL

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Khairy Abdel Fattah Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/276,598

(22) Filed: Jul. 22, 2025

(51) Int. Cl.
| | |
|---|---|
| *B01J 35/45* | (2024.01) |
| *B01J 23/02* | (2006.01) |
| *B01J 23/44* | (2006.01) |
| *B01J 27/24* | (2006.01) |
| *B01J 35/40* | (2024.01) |
| *B01J 35/51* | (2024.01) |
| *B01J 35/61* | (2024.01) |
| *B01J 35/63* | (2024.01) |
| *B01J 35/64* | (2024.01) |
| *B01J 37/03* | (2006.01) |
| *B01J 37/04* | (2006.01) |
| *B01J 37/08* | (2006.01) |
| *B01J 37/34* | (2006.01) |

(52) U.S. Cl.
CPC .............. *B01J 23/44* (2013.01); *B01J 23/02* (2013.01); *B01J 27/24* (2013.01); *B01J 35/40* (2024.01); *B01J 35/45* (2024.01); *B01J 35/51* (2024.01); *B01J 35/613* (2024.01); *B01J 35/615* (2024.01); *B01J 35/617* (2024.01); *B01J 35/618* (2024.01); *B01J 35/635* (2024.01); *B01J 35/638* (2024.01); *B01J 35/647* (2024.01); *B01J 37/031* (2013.01); *B01J 37/04* (2013.01); *B01J 37/08* (2013.01); *B01J 37/342* (2013.01); *B01J 37/343* (2013.01)

(58) Field of Classification Search
None
See application file for complete search history.

(56) References Cited

U.S. PATENT DOCUMENTS

| | | | |
|---|---|---|---|
| 12,420,264 B1* | 9/2025 | Omran | .................... B01J 21/18 |
| 2009/0060830 A1 | 3/2009 | Garcia-Bennet | |
| 2018/0027809 A1 | 2/2018 | Chiattello et al. | |
| 2024/0208872 A1 | 6/2024 | Wang | |

FOREIGN PATENT DOCUMENTS

CN 112920663 A 6/2021

OTHER PUBLICATIONS

Elancheziyan Mari, et al., "Efficient electro-catalytic oxidation of ethylene glycol using flower-like graphitic carbon nitride/iron oxide/palladium nanocomposite for fuel cell application", Fuel, vol. 280, Nov. 15, 2020, 118646, 5 pages.

Aaranda Arooj, et al., "One-step fabrication of surfactant mediated Pd/SiO2, A prospect toward therapeutic and photocatalytic applications", Inorganic Chemistry Communications, vol. 142, Aug. 2022, 109692, 5 pages.

Rahul Krishna, et al., "Facile synthesis of reduced graphene oxide supported Pd@NixB/RGO nanocomposite: Novel electrocatalyst for ethanol oxidation in alkaline media", International Journal of Hydrogen Energy, vol. 41, Issue 27, Jul. 20, 2018, pp. 11811-11822, 5 pages.

* cited by examiner

*Primary Examiner* — Yun Qian

(74) *Attorney, Agent, or Firm* — Oblon, McClelland, Maier & Neustadt, L.L.P.

(57) ABSTRACT

A Pd@PdO/CaSiO$_3$@g-C$_3$N$_4$ nanocomposite material includes spherical metal oxide nanoparticles, including a palladium@palladium oxide (Pd@PdO) phase and a calcium silicate (CaSiO$_3$) phase dispersed on a matrix of graphitic carbon nitride (g-C$_3$N$_4$) nanosheets. The spherical metal oxide nanoparticles have an average particle diameter in a range from 25 to 250 nanometers (nm). The Pd@PdO/CaSiO$_3$@g-C$_3$N$_4$ nanocomposite material has a Brunauer-Emmett-Teller (BET) surface area of at least 45 square meters per gram (m$^2 \cdot$g$^{-1}$). A method of preparing the nanocomposite material includes forming CaSiO$_3$, g-C$_3$N$_4$, and Pd@PdO intermediates and combining in a microwave reaction to form the Pd@PdO/CaSiO$_3$@g-C$_3$N$_4$ nanocomposite material.

20 Claims, 5 Drawing Sheets

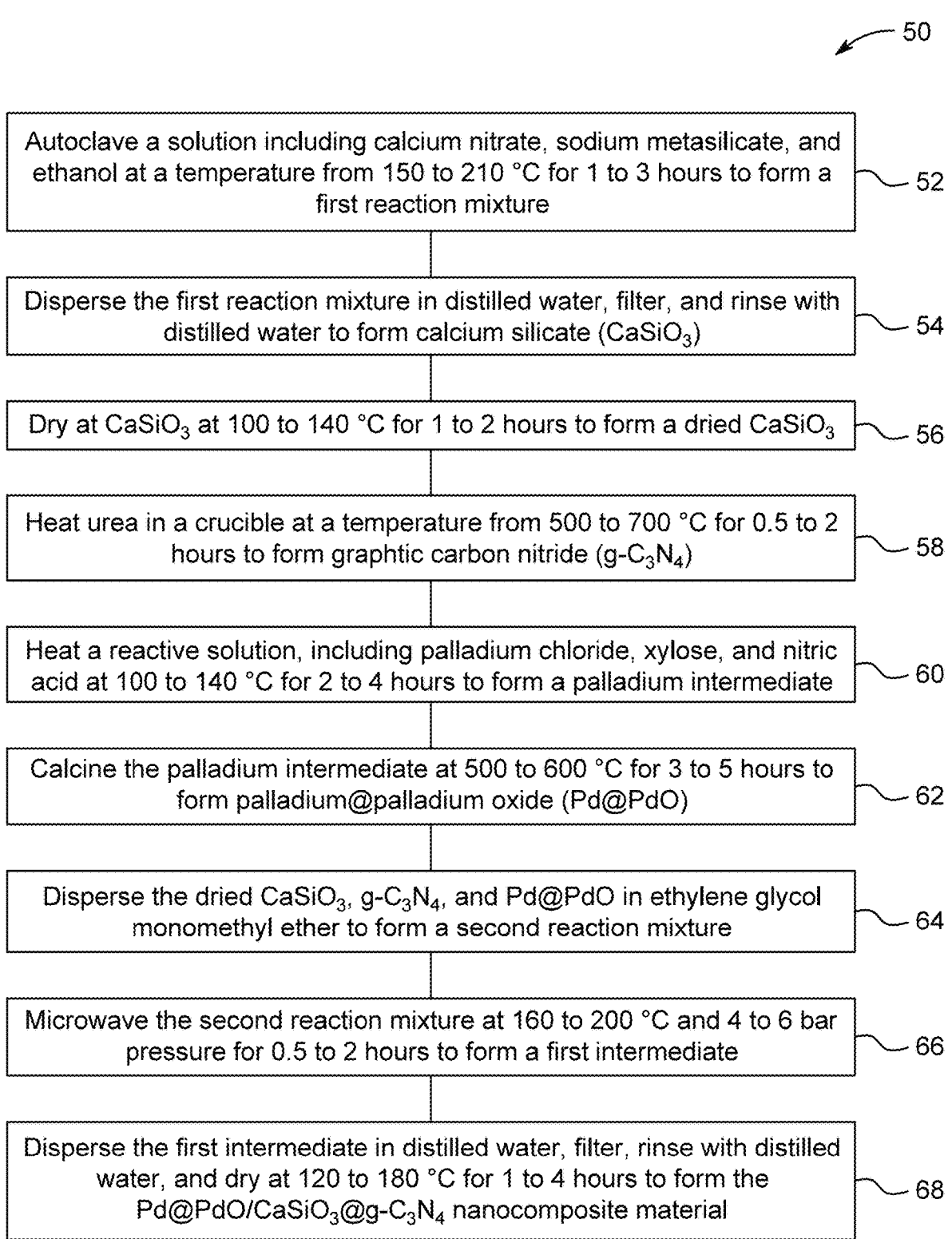

50

Autoclave a solution including calcium nitrate, sodium metasilicate, and ethanol at a temperature from 150 to 210 °C for 1 to 3 hours to form a first reaction mixture ⎯ 52

Disperse the first reaction mixture in distilled water, filter, and rinse with distilled water to form calcium silicate ($CaSiO_3$) ⎯ 54

Dry at $CaSiO_3$ at 100 to 140 °C for 1 to 2 hours to form a dried $CaSiO_3$ ⎯ 56

Heat urea in a crucible at a temperature from 500 to 700 °C for 0.5 to 2 hours to form graphtic carbon nitride ($g\text{-}C_3N_4$) ⎯ 58

Heat a reactive solution, including palladium chloride, xylose, and nitric acid at 100 to 140 °C for 2 to 4 hours to form a palladium intermediate ⎯ 60

Calcine the palladium intermediate at 500 to 600 °C for 3 to 5 hours to form palladium@palladium oxide (Pd@PdO) ⎯ 62

Disperse the dried $CaSiO_3$, $g\text{-}C_3N_4$, and Pd@PdO in ethylene glycol monomethyl ether to form a second reaction mixture ⎯ 64

Microwave the second reaction mixture at 160 to 200 °C and 4 to 6 bar pressure for 0.5 to 2 hours to form a first intermediate ⎯ 66

Disperse the first intermediate in distilled water, filter, rinse with distilled water, and dry at 120 to 180 °C for 1 to 4 hours to form the Pd@PdO/$CaSiO_3$@$g\text{-}C_3N_4$ nanocomposite material ⎯ 68

FIG. 1

PALLADIUM/PALLADIUM OXIDE/CALCIUM SILICATE/GRAPHITIC CARBON NITRIDE NANOCOMPOSITE MATERIAL

BACKGROUND

Technical Field

The present disclosure is directed to a nanocomposite material, and more particularly, to a nanocomposite material including palladium@palladium oxide (Pd@PdO), calcium silicate (CaSiO₃), and graphitic carbon nitride (g-C₃N₄) for use in nanotechnology applications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Carbon-based nanomaterials (CNMs) such as graphene, carbon nanotubes (CNTs), and carbon nanofibers (CNFs) have garnered attention in nanotechnology due to their unique combination of high surface area, excellent electrical conductivity, mechanical strength, and chemical stability. These characteristics make them suitable for applications in energy storage systems like supercapacitors and lithium-ion batteries, where rapid charge transport and large active surface areas are useful. Additionally, their lightweight and flexible nature supports their integration into various devices, including flexible electronics and sensors. However, despite their outstanding properties, CNMs often show limited electrochemical activity and lack the required chemical functionalities for broader applications such as catalysis or ion exchange, which can restrict their overall performance when used alone.

To overcome these limitations, multicomponent nanocomposites have been developed by integrating CNMs with electrochemically active materials such as metal oxides (e.g., $MnO_2$, $TiO_2$, $Fe_2O_3$) and metal silicates (e.g., $CaSiO_3$, $MgSiO_3$). These nanocomposites leverage the conductive framework of CNMs to facilitate rapid electron transport, while the metal-based components introduce enhanced redox activity, ion exchange capacity, and catalytic functionality. This synergy improves properties like specific capacitance, charge-discharge efficiency, structural stability, and long-term performance. Moreover, the carbon matrix helps to prevent the agglomeration of metal particles and enhances dispersion, providing uniform performance throughout the material. As a result, these hybrid nanocomposites offer advantages over single-component systems and are being actively explored in a wide range of nanotechnology applications, including energy storage, environmental remediation, catalysis, and sensor technologies.

Although multicomponent nanocomposite materials have been developed in the past, there still exists a need to develop nanocomposites with improved properties. Accordingly, it is one object of the present disclosure to provide a metal-metal oxide-metal silicate-carbon based quaternary nanocomposite by integrating metal, metal oxides, metal silicate, and carbon nanomaterials to enhance the properties and their synergistic effects, making them ideal for applications in energy storage, catalysis, biomedicine, and environmental sustainability.

SUMMARY

In an exemplary embodiment, a Pd@PdO/CaSiO₃@g-C₃N₄ nanocomposite material is described. The Pd@PdO/CaSiO₃@g-C₃N₄ nanocomposite material includes spherical metal oxide nanoparticles, including a palladium@palladium oxide (Pd@PdO) phase and a calcium silicate (CaSiO₃) phase dispersed on a matrix of graphitic carbon nitride (g-C₃N₄) nanosheets. The spherical metal oxide nanoparticles have an average particle diameter in a range from 25 to 250 nanometers (nm). The Pd@PdO/CaSiO₃@g-C₃N₄ nanocomposite material has a Brunauer-Emmett-Teller (BET) surface area of at least 45 square meters per gram $(m^2 \cdot g^{-1})$.

In some embodiments, the Pd@PdO/CaSiO₃@g-C₃N₄ nanocomposite material has a BET surface area of at least 50 $m^2 \cdot g^{-1}$.

In some embodiments, the Pd@PdO/CaSiO₃@g-C₃N₄ nanocomposite material has a BET surface area of at least 55 $m^2 \cdot g^{-1}$.

In some embodiments, the Pd@PdO/CaSiO₃@g-C₃N₄ nanocomposite material has a pore volume of at least 0.10 cubic centimeters per gram $(cm^3 \cdot g^{-1})$.

In some embodiments, the Pd@PdO/CaSiO₃@g-C₃N₄ nanocomposite material has a pore volume of at least 0.15 $cm^3 \cdot g^{-1}$.

In some embodiments, the Pd@PdO/CaSiO₃@g-C₃N₄ nanocomposite material has a pore volume of at least 0.2 $cm^3 \cdot g^{-1}$.

In some embodiments, the Pd@PdO/CaSiO₃@g-C₃N₄ nanocomposite material has an average pore diameter of 16.39 nm.

In some embodiments, the spherical metal oxide nanoparticles have an average particle diameter in a range from 50 to 150 nm.

In some embodiments, the Pd@PdO/CaSiO₃@g-C₃N₄ nanocomposite material has a mass ratio of the Pd@PdO: CaSiO₃:g-C₃N₄ phases in a range from 0.1-15:0.1-15:0.1-15.

In another exemplary embodiment, a method for making the Pd@PdO/CaSiO₃@g-C₃N₄ nanocomposite material. The method includes autoclaving a solution including calcium nitrate $(Ca(NO_3)_2)$, sodium metasilicate $(Na_2SiO_3)$, and ethanol $(C_2H_5OH)$ at a temperature from 150 to 210 degrees Celsius (° C.) for 1 to 3 hours (h) to form a first reaction mixture. The method further includes dispersing the first reaction mixture in distilled water, filtering, and rinsing with distilled water to form CaSiO₃ and drying the CaSiO₃ at 100 to 140° C. for 1 to 2 h to form a dried CaSiO₃. The method further includes heating urea in a crucible at a temperature from 500 to 700° C. for 0.5 to 2 h to form g-C₃N₄ and heating a reactive solution including palladium chloride $(PdCl_2)$, xylose, and nitric acid $(HNO_3)$ at 100 to 140° C. for 2 to 4 h to form a Pd intermediate. The method further includes calcining the Pd intermediate at a 500 to 600° C. for 3 to 5 h to form Pd@PdO and dispersing the dried CaSiO₃, g-C₃N₄, and Pd@PdO in ethylene glycol monomethyl ether to form a second reaction mixture. The method further includes microwaving the second reaction mixture at 160 to 200° C. and 4 to 6 bar pressure for 0.5 to 2 h to form a first intermediate and dispersing the first intermediate in distilled water, filtering, rinsing with distilled water, and finally, drying at 120 to 180° C. for 1 to 4 h to form the Pd@PdO/CaSiO$_3$@g-C$_3$N$_4$ nanocomposite material.

In some embodiments, the concentration of CaNO$_3$ in the first reaction mixture is in a range from 0.1 to 10 g/L.

In some embodiments, the concentration of Na$_2$SiO$_3$ in the first reaction mixture is in a range from 0.1 to 10 g/L.

In some embodiments, the concentration of C$_2$H$_5$OH in the first reaction mixture is in a range from 400 to 600 milliliters per liter (mL/L).

In some embodiments, the urea is heated in the crucible at a temperature of 600° C. for 45 minutes (min).

In some embodiments, the concentration of PdCl$_2$ in the reactive solution is in a range from 12 to 24 grams per litre (g/L).

In some embodiments, the concentration of xylose in the reactive solution is in a range from 35 to 55 g/L.

In some embodiments, the concentration of HNO$_3$ in the reactive solution is in a range from 80 to 100 ml/L.

In some embodiments, the Pd intermediate is calcined at 550° C. for 4 h to form Pd@PdO.

In some embodiments, the second reaction mixture is microwaved at 180° C. and 5 bar pressure.

In some embodiments, the second reaction mixture is microwaved for 1 hour.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is an exemplary flowchart for preparing a Pd@PdO/CaSiO$_3$@g-C$_3$N$_4$ nanocomposite material, according to certain embodiments.

DETAILED DESCRIPTION

Figure 2:
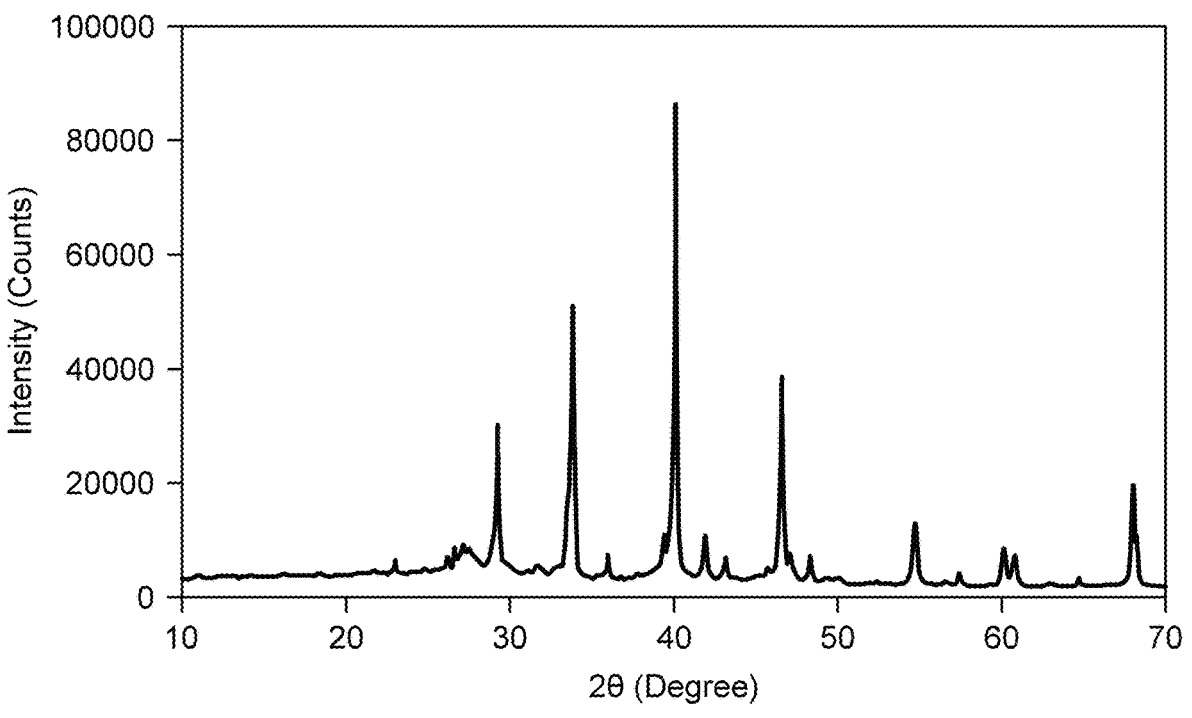
FIG. 2 shows an X-ray diffraction (XRD) diffractogram of the Pd@PdO/CaSiO$_3$@g-C$_3$N$_4$ nanocomposite material, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings, wherever applicable, in that some, but not all, embodiments of the disclosure are shown.

In the drawings, like reference numerals designate identical or corresponding parts throughout the several views. Further, as used herein, the words 'a', 'an', and the like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoint.

As used herein, the term 'room temperature' refers to a temperature range of '25 degrees Celsius (° C.)±3° C. in the present disclosure.

As used herein, the term 'nanoparticles' refers to particles having a particle size of 1 nanometer (nm) to 1000 nm within the scope of the present disclosure.

As used herein, the term 'nanocomposite' refers to a composite material that has at least one component with a grain size measured in nm.

As used herein, the term 'nanocomposite materials' refers to multi-phase materials composed of a matrix embedded with nanoscale fillers or components, typically less than 1000 nm in size.

As used herein, the term 'average particle diameter' refers to the mean size of particles in a given sample, typically measured in nanometers (nm), micrometers (μm), or millimeters (mm), depending on the material.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a useful parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram (cm$^3$ g$^{-1}$) and is a useful parameter in characterizing the porous structure of materials, such as adsorbents or catalysts.

As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopes of nitrogen include $^{14}N$ and $^{15}N$. Isotopes of Ca include $^{40}Ca$, $^{42}Ca$, $^{43}Ca$, $^{44}Ca$, and $^{46}Ca$. Isotopes of silicon include $^{28}Si$, $^{29}Si$, and $^{30}Si$. Isotopes of hydrogen include $^{1}H$, $^{2}H$, and $^{3}H$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of this disclosure are directed to a Pd@PdO/CaSiO$_3$@g-C$_3$N$_4$ nanocomposite material fabricated via a multi-step solvothermal precipitation method. The successful integration of palladium (Pd), palladium oxide (PdO), calcium silicate (CaSiO$_3$), and graphitic carbon nitride (g-C$_3$N$_4$) yields a precisely engineered nanocomposite material achieving uniform distribution, controlled morphology, and multi-component integration. The synergistic effect of multiple components leads to the nanocomposite material being a promising platform for nanotechnology applications.

According to a first aspect of the present disclosure, a Pd@PdO/CaSiO$_3$@g-C$_3$N$_4$ nanocomposite material (also referred to as the nanocomposite or nanocomposite material) is described. The Pd@PdO/CaSiO$_3$@g-C$_3$N$_4$ nanocomposite material includes spherical metal oxide nanoparticles, including a Pd@PdO phase and a CaSiO$_3$ phase, dispersed on a matrix of g-C$_3$N$_4$ nanosheets. In some embodiments, PdO exists in the tetragonal phase. In some embodiments, PdO may exist in another crystalline phase, including cubic. In some embodiments, CaSiO$_3$ exists in the monoclinic phase. In some embodiments, CaSiO$_3$ may exist in other crystalline phases, including triclinic and orthorhombic crystalline phases. In some embodiments, g-C$_3$N$_4$ has a semi-crystalline phase.

The metal oxide nanoparticles included in the nanocomposite may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc., and mixtures thereof. In a preferred embodiment, the metal oxide nanoparticles are spherical.

In some embodiments, the spherical metal oxide nanoparticles have an average particle diameter in a range from 10 to 500 nm, preferably 25 to 250 nm, preferably 30 to 245 nm, preferably 35 to 240 nm, preferably 40 to 235 nm, preferably 45 to 230 nm, preferably 50 to 225 nm, preferably 55 to 220, preferably 60 to 215 nm, preferably 65 to 210 nm, preferably 70 to 205 nm, preferably 75 to 200, preferably 80 to 195 nm, preferably 95 to 190 nm, and preferably 100 to 185 nm.

In some embodiments, the spherical metal oxide nanoparticles have an average particle diameter in a range from 50 to 150 nm, preferably 52 to 148 nm, preferably 54 to 146 nm, preferably 56 to 144 nm, preferably 58 to 142 nm, preferably 60 to 140 nm, preferably 62 to 138 nm, preferably 64 to 136 nm, preferably 66 to 134 nm, preferably 68 to 132 nm, preferably 70 to 130 nm, preferably 72 to 128 nm, preferably 74 to 126 nm, preferably 76 to 124 nm, preferably 78 to 122 nm, preferably 80 to 120 nm, preferably 82 to 118 nm, preferably 84 to 116 nm, preferably 86 to 114 nm, preferably 88 to 112 nm, preferably 90 to 110 nm, preferably 92 to 108 nm, preferably 94 to 106 nm, and preferably 96 to 104 nm. In a preferred embodiment, the spherical metal oxide nanoparticles have an average particle diameter of 103 nm.

In one or more embodiments, the Pd@PdO/CaSiO$_3$@g-C$_3$N$_4$ nanocomposite material has a mass ratio of the Pd@PdO:CaSiO$_3$:g-C$_3$N$_4$ phases in a range from 0.1-15:0.1-15:0.1-15, preferably 0.25-10:0.25-10:0.25-10, preferably 0.5-7.5:0.5-7.5:0.5-7.5, preferably 0.75-6:0.75-6:0.75-6, preferably 1-5:1-5:1-5.

The Brunauer-Emmett-Teller (BET) hypothesis is the foundation for a useful analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably N$_2$ adsorption analysis (e.g., N$_2$ adsorption isotherms).

In some embodiments, the Pd@PdO/CaSiO$_3$@g-C$_3$N$_4$ nanocomposite material has a BET surface area of at least 30 square meters per gram (m$^2$·g$^{-1}$), preferably at least 45 m$^2$·g$^{-1}$, preferably at least 46 m$^2$·g$^{-1}$, preferably at least 47 m$^2$·g$^{-1}$, preferably at least 48 m$^2$·g$^{-1}$, preferably at least 49 m$^2$·g$^{-1}$, preferably at least 50 m$^2$·g$^{-1}$, preferably at least 51 m$^2$·g$^{-1}$, preferably at least 52 m$^2$·g$^{-1}$, preferably at least 53 m$^2$·g$^{-1}$, preferably at least 54 m$^2$·g$^{-1}$, preferably at least 55 m$^2$·g$^{-1}$, preferably at least 56 m$^2$·g$^{-1}$.

In some embodiments, the Pd@PdO/CaSiO$_3$@g-C$_3$N$_4$ nanocomposite material has a BET surface area of at least 50 m$^2$·g$^{-1}$, preferably at least 50.5 m$^2$·g$^{-1}$, preferably at least 51.0 m$^2$·g$^{-1}$, preferably at least 51.5 m$^2$·g$^{-1}$, preferably at least 52.0 m$^2$·g$^{-1}$, preferably at least 52.5 m$^2$·g$^{-1}$, preferably at least 53.0 m$^2$·g$^{-1}$, preferably at least 53.5 m$^2$·g$^{-1}$, preferably at least 54.0 m$^2$·g$^{-1}$, preferably at least 54.5 m$^2$·g$^{-1}$, preferably at least 55.0 m$^2$·g$^{-1}$, preferably at least 55.5 m$^2$·g$^{-1}$, preferably at least 56.0 m$^2$·g$^{-1}$, and preferably at least 56.5 m$^2$·g$^{-1}$.

In some embodiments, the Pd@PdO/CaSiO$_3$@g-C$_3$N$_4$ nanocomposite material has a BET surface area of at least 55.0 m$^2$·g$^{-1}$, preferably at least 55.1 m$^2$·g$^{-1}$, preferably at least 55.2 m$^2$·g$^{-1}$, preferably at least 55.3 m$^2$·g$^{-1}$, preferably at least 55.4 m$^2$·g$^{-1}$, preferably at least 55.5 m$^2$·g$^{-1}$, preferably at least 55.6 m$^2$·g$^{-1}$, preferably at least 55.7 m$^2$·g$^{-1}$, preferably at least 55.8 m$^2$·g$^{-1}$, preferably at least 55.9 m$^2$·g$^{-1}$, preferably at least 56.0 m$^2$·g$^{-1}$, preferably at least 56.1 m$^2$·g$^{-1}$, preferably at least 56.2 m$^2$·g$^{-1}$, preferably at least 56.3 m$^2$·g$^{-1}$, preferably at least 56.4 m$^2$·g$^{-1}$, preferably at least 56.5 m$^2$·g$^{-1}$, preferably at least 56.6 m$^2$·g$^{-1}$, and preferably at least 56.7 m$^2$·g$^{-1}$. In a preferred embodiment, the Pd@PdO/CaSiO$_3$@g-C$_3$N$_4$ nanocomposite material has a BET surface area equal to 56.8 m$^2$·g$^{-1}$.

In some embodiments, an average pore distribution of the nanocomposite may include, but is not limited to, crystalline average pore distribution, bimodal, trimodal, multimodal, narrow, broad, and Gaussian. In a preferred embodiment, the average pore distribution of the nanocomposite is unimodal, indicating a single dominant pore size population within the material. This unimodal distribution indicates that the nano-composites possess a relatively narrow pore size range, resulting in more uniform pore structures and enhancing specific properties such as adsorption capacity, catalytic activity, or surface reactivity.

In some embodiments, the $Pd@PdO/CaSiO_3@g\text{-}C_3N_4$ nanocomposite material has an average pore diameter of 5 to 35 nm, preferably of 10 to 25 nm, preferably 11 to 24 nm, preferably 12 to 23 nm, and preferably 13 to 22 nm, as determined by BJH desorption analysis. In a preferred embodiment, the $Pd@PdO/CaSiO_3@g\text{-}C_3N_4$ nanocomposite material has an average pore diameter of 16.39 nm.

In some embodiments, the $Pd@PdO/CaSiO_3@g\text{-}C_3N_4$ nanocomposite material has a pore volume of at least 0.05 $cm^3 \cdot g^{-1}$, preferably at least 0.10 $cm^3 \cdot g^{-1}$, preferably at least 0.11 $cm^3 \cdot g^{-1}$, preferably at least 0.12 $cm^3 \cdot g^{-1}$, preferably at least 0.13 $cm^3 \cdot g^{-1}$, preferably at least 0.14 $cm^3 \cdot g^{-1}$, preferably at least 0.15 $cm^3 \cdot g^{-1}$, preferably at least 0.16 $cm^3 \cdot g^{-1}$, preferably at least 0.17 $cm^3 \cdot g^{-1}$, preferably at least 0.18 $cm^3 \cdot g^{-1}$, preferably at least 0.19 $cm^3 \cdot g^{-1}$, and preferably at least 0.20 $cm^3 \cdot g^{-1}$.

In some embodiments, the $Pd@PdO/CaSiO_3@g\text{-}C_3N_4$ nanocomposite material has a pore volume of at least 0.150 $cm^3 \cdot g^{-1}$, preferably at least 0.155 $cm^3 \cdot g^{-1}$, preferably at least 0.160 $cm^3 \cdot g^{-1}$, preferably at least 0.165 $cm^3 \cdot g^{-1}$, preferably at least 0.170 $cm^3 \cdot g^{-1}$, preferably at least 0.175 $cm^3 \cdot g^{-1}$, preferably at least 0.180 $cm^3 \cdot g^{-1}$, preferably at least 0.185 $cm^3 \cdot g^{-1}$, preferably at least 0.190 $cm^3 \cdot g^{-1}$, preferably at least 0.195 $cm^3 \cdot g^{-1}$, and preferably at least 0.200 $cm^3 \cdot g^{-1}$.

In some embodiments, the $Pd@PdO/CaSiO_3@g\text{-}C_3N_4$ nanocomposite material has a pore volume of at least 0.200 $cm^3 \cdot g^{-1}$, preferably at least 0.201 $cm^3 \cdot g^{-1}$, preferably at least 0.202 $cm^3 \cdot g^{-1}$, preferably at least 0.203 $cm^3 \cdot g^{-1}$, and preferably at least 0.204 $cm^3 \cdot g^{-1}$. In a preferred embodiment, the $Pd@PdO/CaSiO_3@g\text{-}C_3N_4$ nanocomposite material has a pore volume equal to about 0.205 $cm^3 \ g^{-1}$.

FIG. 1 illustrates a flow chart of a method 50 of preparing the $Pd@PdO/CaSiO_3@g\text{-}C_3N_4$ nanocomposite material. The above-mentioned method involves the controlled formation of solid particles from a solution through chemical reactions that lead to supersaturation and subsequent nucleation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes autoclaving a solution including calcium nitrate ($Ca(NO_3)_2$), sodium metasilicate ($Na_2SiO_3$), and ethanol ($C_2H_5OH$) to form a first reaction mixture at a temperature from 120 to 250 degrees Celsius (° C.), preferably 150 to 210 degrees ° C., preferably 155 to 205° C., preferably 160 to 200° C., preferably 165 to 195° C., preferably 170 to 190° C., and preferably 175 to 185° C. for 0.5 to 4.0 hours (h), preferably 1.0 to 3.0 h, preferably 1.1 to 2.9 h, preferably 1.2 to 2.8 h, preferably 1.3 to 2.7 h, preferably 1.4 to 2.6 h, preferably 1.5 to 2.5 h, preferably 1.6 to 2.4 h, preferably 1.7 to 2.3 h, preferably 1.8 to 2.2 h, and preferably 1.9 to 2.1 h. In a preferred embodiment, autoclaving a solution including $Ca(NO_3)_2$, $Na_2SiO_3$, and $C_2H_5OH$ to form a first reaction mixture at a temperature of 180° C. for 2 h. This step involves the chemical reaction and dehydration process that are required for converting the precursor materials into the desired solid product. The solution is preferably heated in an autoclave, optionally, other known heating appliances may be used as well.

In some embodiments, the calcium ion source used is $Ca(NO_3)_2$. In some embodiments, calcium ion source may include but is not limited to calcium chloride, calcium sulfate, calcium carbonate, calcium phosphate, calcium acetate, calcium citrate, calcium lactate, calcium gluconate, calcium formate, calcium oxalate, calcium tartrate, calcium ascorbate, calcium benzoate, calcium propionate, calcium stearate, calcium hydroxide, calcium peroxide, calcium iodate, calcium molybdate, calcium hypochlorite, calcium thiocyanate, calcium chromate, calcium ferrite, calcium bromide, calcium fluoride, calcium sulfide, calcium arsenate, calcium tungstate, calcium borate, calcium perchlorate, calcium hydride, and combinations thereof.

In some embodiments, the concentration of calcium nitrate in the first reaction mixture is in a range from 0.1 to 10 g/L. In some embodiments, the alkali metal silicate is $Na_2SiO_3$. In some embodiments, the alkali metal silicate may include but is not limited to potassium silicate, lithium silicate, rubidium silicate, cesium silicate, sodium orthosilicate, potassium orthosilicate, lithium orthosilicate, rubidium orthosilicate, cesium orthosilicate, sodium disilicate, potassium disilicate, lithium disilicate, rubidium disilicate, cesium disilicate, sodium trisilicate, potassium trisilicate, lithium trisilicate, rubidium trisilicate, cesium trisilicate, sodium tetrasilicate, potassium tetrasilicate, lithium tetrasilicate, rubidium tetrasilicate, cesium tetrasilicate, sodium hexasilicate, potassium hexasilicate, lithium hexasilicate, rubidium hexasilicate, cesium hexasilicate, and combinations thereof. In a preferred embodiment, alkali metal silicate is sodium metasilicate.

In some embodiments, the concentration of sodium metasilicate in the first reaction mixture is in a range from 0.1 to 10 g/L.

In some embodiments, the molar ratio of the $Ca(NO_3)_2$ to the $Na_2SiO_3$ may include, but not limited to, 1:6 to 6:1, preferably 1:5 to 5:1, preferably 1:4 to 4:1, preferably 3:1 to 1:3, preferably 1:2 to 2:1, and preferably 1:1. In a preferred embodiment, the molar ratio of the $Ca(NO_3)_2$ to the $Na_2SiO_3$ is 1:1.

In a preferred embodiment, ethanol is used in step 52, however, other C1-C4 alkanols may be used. In some embodiments, C1-C4 alkanol may include but is not limited to methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. The volume-by-volume (v/v) ratio of water to ethanol is in the range of 1:6 to 6:1, preferably 1:5 to 5:1, preferably 1:4 to 4:1, preferably 1:3 to 3:1, preferably 1:2 to 2:1, preferably 1:1. In a preferred embodiment, the v/v ratio of water to ethanol is 1:1.

In some embodiments, the concentration of $C_2H_5OH$ in the first reaction mixture is in a range from 200 to 800 milliliters per litre (mL/L), preferably 400 to 600 mL/L, preferably 420 to 580 mL/L, preferably 440 to 560 mL/L, preferably 460 to 540 mL/L, and preferably 480 to 520 mL/L. In a preferred embodiment, the concentration of $C_2H_5OH$ in the first reaction mixture is 500 mL/L.

At step 54, the method 50 includes dispersing the first reaction mixture in distilled water, filtering, and rinsing with distilled water to form $CaSiO_3$. In some embodiments, the solid particles of the first reaction mixture are separated by distinct methods, which may include, but are not limited to, gravity filtration, centrifugation, hot filtration, cold filtration, granular media filtration, mechanical filtration, multilayer filtration, and vacuum filtration. In a preferred embodiment, solid crystalline nanocomposite from the heated dispersion is separated by vacuum filtration using a Buchner filtration system. The water may be tap water, distilled water, bi-distilled water, deionized water, deionized distilled water, reverse osmosis water, and/or some other water. In a preferred embodiment, the water for rinsing in the Buchner filtration system is distilled water.

At step 56, the method 50 includes drying the $CaSiO_3$ to form a dried $CaSiO_3$ at 80 to 200° C., preferably 100 to 140° C., preferably 105 to 135° C., preferably 110 to 130° C., and preferably 115 to 125° C. for 0.25 to 5 h, preferably 0.5 to 3 h, preferably 0.6 to 2.9 h, preferably 0.7 to 2.8 h, preferably 0.8 to 2.7 h, and preferably 0.9 to 2.6 h. In some embodiments, drying the $CaSiO_3$ is performed for 1 to 2 h. In a preferred embodiment, drying the $CaSiO_3$ to form a dried $CaSiO_3$ is performed at 120° C. for 1 h to evaporate the solvents completely. The first reaction mixture may be heated using any heating appliances such as ovens, microwaves, autoclaves, hot plates, heating mantles and tapes, oil baths, salt baths, sand baths, air baths, hot-tube furnaces, and hot-air guns.

At step 58, the method 50 includes heating urea in a crucible to form $g\text{-}C_3N_4$ at a temperature from 400 to 800° C., preferably 500 to 700° C., preferably 520 to 680° C., preferably 540 to 660° C., preferably 560 to 640° C., and preferably 580 to 620° C. for a period of 15 minutes to 90 minutes, preferably 30 minutes to 60 minutes, preferably 40 minutes to 50 minutes, preferably about 45 minutes. Heating is done in a closed vessel at step 58 to maintain a controlled atmosphere, preventing the escape of volatile components and leading to the formation of $g\text{-}C_3N_4$ under the required conditions of pressure and temperature. In a preferred embodiment, the urea is heated to a temperature of about 600° C. for a period of about 45 minutes.

At step 60, the method 50 includes heating a reactive solution including palladium chloride ($PdCl_2$), xylose, and nitric acid ($HNO_3$) to form a palladium intermediate at 80 to 180° C., preferably 100 to 140° C., preferably 105 to 135° C., preferably 110 to 130° C., and preferably 115 to 125° C. for 1 to 5 h, preferably 2 to 4 h, preferably 2.2 to 3.8 h, preferably 2.4 to 3.6 h, preferably 2.6 to 3.4 h, and preferably 2.8 to 3.2 h. In a preferred embodiment, heating a reactive solution including palladium chloride ($PdCl_2$), xylose, and $HNO_3$ to form a palladium intermediate is performed at 120° C. for 3 h.

In some embodiments, the palladium salt used is palladium chloride ($PdCl_2$). In some embodiments, palladium ion source may include but is not limited to palladium chloride, palladium sulfate, palladium carbonate, palladium phosphate, palladium acetate, palladium citrate, palladium lactate, palladium gluconate, palladium formate, palladium oxalate, palladium tartrate, palladium ascorbate, palladium benzoate, palladium propionate, palladium stearate, palladium hydroxide, palladium (IV) peroxide, palladium iodate, palladium molybdate, palladium hypochlorite, palladium thiocyanate, palladium chromate, palladium ferrite, palladium bromide, palladium fluoride, palladium sulfide, palladium arsenate, palladium tungstate, palladium borate, palladium perchlorate, palladium hydride, and combinations thereof.

In some embodiments, the reducing sugar used is xylose. In some embodiments, the reducing sugar is a monosaccha-ride selected from the group consisting of trioses, tetroses, pentoses, hexoses, heptoses, and combinations thereof. In some embodiments, the reducing sugar may include but is not limited to the erythrose, threose, erythrulose, ribose, arabinose, xylose, lyxose, ribulose, arabulose, xylulose, lyxulose, glucose, mannose, galactose, allose, altrose, talose, gulose, idose, fructose, psicose, sorbose, tagatose, sedoheptulose, and combinations thereof.

In some embodiments, sulfuric acid ($H_2SO_4$), being a strong acid, may be used in the reaction at step 60 as it may effectively break down palladium oxychloride octahydrate and facilitate the formation of a palladium intermediate. Hydrochloric acid (HCl) is capable of dissolving metal chlorides and promoting the reaction. Phosphoric acid ($H_3PO_4$) may also be used, including if a more controlled reaction or specific palladium phases are desired. The choice of acid depends on the desired reactivity and the final properties of the palladium-based material. In a preferred embodiment, the acid used in the reaction to form palladium intermediate is nitric acid ($HNO_3$).

In some embodiments, the concentration of $PdCl_2$ in reactive solution is in a range from 5 to 35 g/L, preferably 12 to 24 g/L, preferably 13 to 23 g/L, preferably 14 to 22 g/L, and preferably 15 to 21 g/L. In a preferred embodiment, the concentration of $PdCl_2$ in a reactive solution is 18 g/L.

In some embodiments, the concentration of xylose in the reactive solution is in a range from 25 to 65 g/L, preferably 35 to 55 g/L, preferably 36 to 54 g/L, preferably 37 to 53 g/L, preferably 38 to 52 g/L, and preferably 39 to 51 g/L. In a preferred embodiment, the concentration of xylose in the reactive solution is 50 g/L.

In some embodiments, the concentration of $HNO_3$ in the reactive solution is in a range from 60 to 120 mL/L, preferably 80 to 100 ml/L, preferably 82 to 98 mL/L, preferably 84 to 96 mL/L, and preferably 86 to 94 mL/L, and preferably 88 to 92 mL/L. In a preferred embodiment, the concentration of $HNO_3$ in the reactive solution is 90 mL/L.

At step 62, the method 50 includes calcining the palladium intermediate to form Pd@PdO at 400 to 700° C., preferably 500 to 600° C., preferably 510 to 590° C., preferably 520 to 580° C., preferably 530 to 570° C., and preferably 540 to 560° C. for 2 to 6 h, preferably 3 to 5 h, preferably 3.2 to 4.8 h, preferably 3.4 to 4.6 h, preferably 3.6 to 4.4 h, and preferably 3.8 to 4.2 h. In a preferred embodiment, calcining the palladium intermediate to form Pd@PdO is performed at 550° C. for 4 h. The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system. This process leads to the formation of a Pd@PdO. The high temperature accelerates the reaction, promoting the required chemical transformations.

At step 64, the method 50 includes dispersing the dried $CaSiO_3$, $g\text{-}C_3N_4$, and Pd@PdO in ethylene glycol monomethyl ether to form a second reaction mixture. In some embodiments, ethylene glycol monomethyl ether is used, however other polar protic solvents may be used including, but not limited to, water, methanol, ethanol, propanol, isopropanol, butanol, isobutanol, sec-butanol, tert-butanol, pentanol, hexanol, heptanol, octanol, nonanol, decanol, formic acid, acetic acid, propionic acid, butyric acid, lactic acid, glycolic acid, glycerol, ethylene glycol, propylene glycol, diethylene glycol, triethylene glycol, 1,2-butanediol, 1,3-butanediol, 1,2-pentanediol, 1,3-propanediol and combinations thereof. In a preferred embodiment, the polar protic solvent used is ethylene glycol monomethyl ether.

At step 66, the method 50 includes microwaving the second reaction mixture to form a first intermediate at 120 to 240° C., preferably 160 to 200° C., preferably 165 to 195° C., preferably 170 to 190° C., and preferably 175 to 185° C., and 2 to 8 bar, preferably 4 to 6 bar, preferably 4.1 to 5.9 bar, preferably 4.2 to 5.8 bar, preferably 4.3 to 5.7 bar, preferably 4.4 to 5.6 bar, preferably 4.5 to 5.5 bar, preferably 4.6 to 5.4, preferably 4.7 to 5.3 bar, preferably 4.8 to 5.2 bar, and preferably 4.9 to 5.1 bar pressure for 0.25 to 4 h, preferably 0.5 to 2 h, preferably 0.6 to 1.9 h, preferably 0.7 to 1.8 h, preferably 0.8 to 1.7 h, preferably 0.7 to 1.8 h, preferably 0.8 to 1.7 h, and preferably 0.9 to 1.6 h. In a preferred embodiment, microwaving the second reaction mixture to form a first intermediate at 180° C. and 5.0 bar pressure for 1.0 h. The solution is preferably heated in a microwave; optionally, other known heating appliances may be used as well.

At step 68, the method 50 includes dispersing the first intermediate in distilled water, filtering, rinsing with distilled water, and drying at 80 to 220° C., preferably 120 to 180° C., preferably 125 to 175° C., preferably 130 to 170° C., preferably 135 to 165° C., preferably 140 to 160° C., and preferably 145 to 155° C. for 0.5 to 6 h, preferably 1 to 4 h, preferably 1.2 to 3.8 h, preferably 1.4 to 3.6 h, preferably 1.6 to 3.4 h, and preferably 1.8 to 3.2 h to form the Pd@PdO/CaSiO$_3$@g-C$_3$N$_4$ nanocomposite material. In a preferred embodiment, after dispersing the first intermediate in distilled water, filtering, and rinsing with distilled water, drying is performed at 150° C. for 2 h to form the Pd@PdO/CaSiO$_3$@g-C$_3$N$_4$ nanocomposite material.

In some embodiments, the solid nanocomposite material is separated by distinct methods, which may include, but are not limited to, gravity filtration, centrifugation, hot filtration, cold filtration, granular media filtration, mechanical filtration, multilayer filtration, and vacuum filtration. In a preferred embodiment, the solid nanocomposite material is separated by vacuum filtration using a Buchner filtration system. The water may be tap water, distilled water, bidistilled water, deionized water, deionized distilled water, reverse osmosis water, and/or some other water. In a preferred embodiment, the water is distilled water for rinsing in the Buchner filtration system.

EXAMPLES

The following examples demonstrate a Pd@PdO/CaSiO$_3$@g-C$_3$N$_4$ nanocomposite material (herein referred to as the nanocomposite or nanocomposite material). The examples are provided solely for illustration and are not to be construed as limitations of the present disclosure, as many variations thereof are possible without departing from the spirit and scope of the present disclosure.

Example 1: Fabricating the Pd@PdO/CaSiO$_3$@g-C$_3$N$_4$

Equal moles of calcium nitrate (0.5 g) and sodium metasilicate (0.37 g) were dispersed in 100 milliliters (mL) of ethanol:water (1:1) in a 150 mL glass beaker and sonicated for 15 minutes. The mixture was transferred to a 200 mL autoclave and then placed in an oven operated at 180° C. for 2 hours. The product was dispersed in 500 ml distilled water with an ultrasonic bath for 10 minutes, filtered via a Buchner system, rinsed with distilled water, and dried at 120° C. for 1 hour.

About 30 grams (g) of urea (NH$_2$CONH$_2$) was placed in a 250 milliliters (mL) porcelain crucible and covered with its porcelain cover, then the crucible and cover were wrapped with three layers of aluminum foil to reduce the NH$_2$CONH$_2$ loss to sublimation. The crucible was heated via a furnace set at 600° C. for 45 min.

About 2 g of palladium chloride (PdCl$_2$) and 5 g of xylose were placed in a 500 ml beaker. 100 ml distilled water was added to the mixture and heated till a clear solution was obtained. 10 mL of concentrated nitric acid (HNO$_3$) was added to the mixture, which was then heated till the carbonization of C$_5$H$_{10}$O$_5$. The mixture was placed in an oven set at 120° C. for 3 h; the black product was milled in a mortar, placed in a 150 mL porcelain dish, and calcined at 550° C. for 4 h.

An equal amount of calcium silicate (CaSiO$_3$), graphitic carbon nitride (g-C$_3$N$_4$), and palladium@palladium oxide (Pd@PdO) (0.5 grams each) were transferred to a mono wave-200 vial (G30) and dispersed in 20 mL ethylene glycol monomethyl ether via an ultrasonic bath for 30 minutes. The vial was closed with its Teflon cover and placed in the Anton-Baar Monowave-200 operated at 180° C. and 5 bar pressure for 1 h. The product was dispersed in 1 liter (L) distilled water with an ultrasonic bath for 30 minutes, filtered via a Buchner system, rinsed with distilled water, and dried at 150° C. for 2 h.

The crystallinity and phases identification present in Pd@PdO/CaSiO$_3$@g-C$_3$N$_4$ catalyst were analyzed by X-ray diffraction (XRD), and the results are given in FIG. 2. The intense peaks and high-intensity values indicated the highly crystalline nature of the nanocomposite. In addition, the peak broadening indicates the small particle size of the prepared nanocomposite. Examination of the diffraction patterns with the standard joint committee on powder diffraction standards (JCPDS) cards reveals the presence of metallic Pd, PdO, CaSiO$_3$, and g-C$_3$N$_4$. The diffraction peaks for PdO phase were observed at 2θ values of 33.3°, 34.0°, 42.2°, 54.9°, and 60.5°, corresponding to (002), (101), (110), (112), and (103) planes, respectively, of the tetragonal phase of the PdO phase (JCPDS number (no.) 00-041-1107). Strong diffractions related to metallic Pd (JCPDS no. 00-046-1043) were observed at 2θ values of 40.3°, 46.6°, and 68.4°, corresponding to (111), (200), and (220) planes, respectively. The diffraction peaks for CaSiO$_3$ were observed at 2θ values of 27.0°, 29.4°, 39.4°, and 48.8°, corresponding to (−202), (−221), (−521), and (−810) planes, respectively, of the monoclinic phase of CaSiO$_3$ (JCPDS no. 00-043-1460). The diffractions related to g-C$_3$N$_4$ were observed at 22.9, 26.7, and 47.1° (COD No. 1534042 and JCPDS no. 01-087-1526). The weak diffractions of both CaSiO$_3$ and g-C$_3$N$_4$ phases demonstrated their semi-crystalline nature, and strong diffractions of both PdO and Pd phases demonstrated their high crystalline nature. No other phases were observed and indicating the successful fabrication of Pd@PdO/CaSiO$_3$@g-C$_3$N$_4$ nanocomposite material.

Figure 3A:
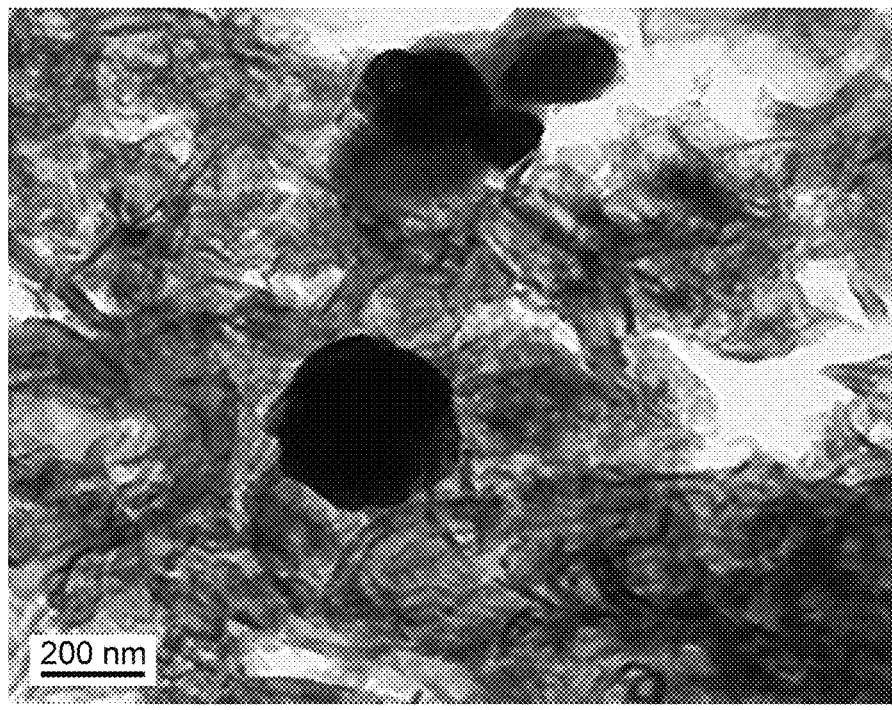
FIG. 3A shows a transmission electron microscopy (TEM) image of the Pd@PdO/CaSiO$_3$@g-C$_3$N$_4$ nanocomposite material at 200 nm scale, according to certain embodiments.
Figure 3B:
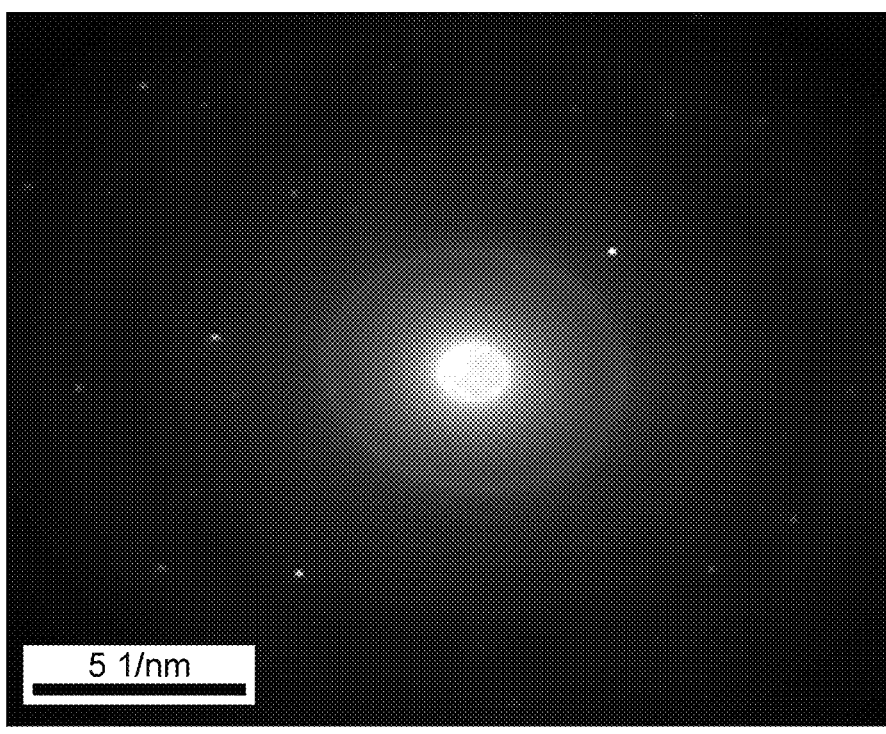
FIG. 3B shows a selected area electron diffraction (SAED) pattern of the Pd@PdO/CaSiO$_3$@g-C$_3$N$_4$ nanocomposite material, according to certain embodiments.
Figure 3C:
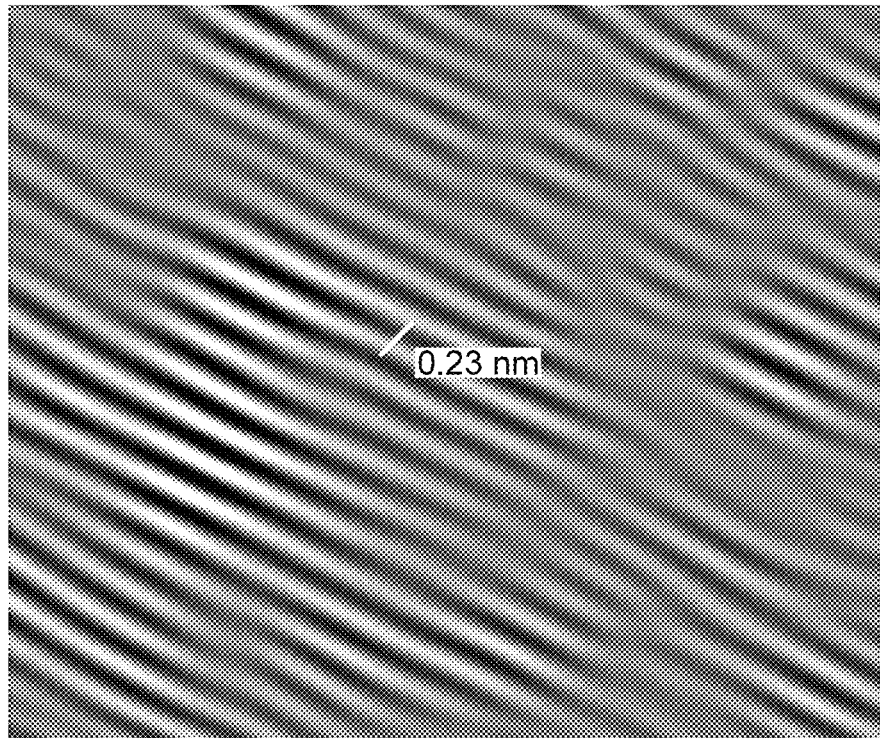
FIG. 3C shows an inverse fast Fourier transform (IFFT) measurement of the HRTEM image of the Pd@PdO/CaSiO$_3$@g-C$_3$N$_4$ nanocomposite material, according to certain embodiments.
Figure 3D:
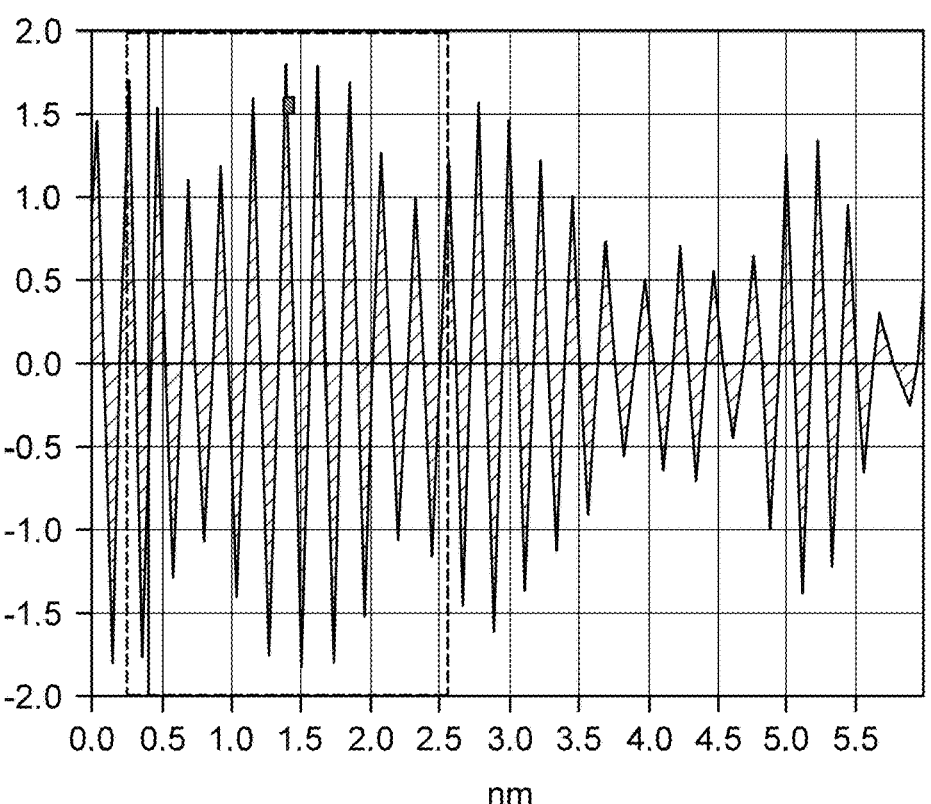
FIG. 3D shows a fast Fourier transform (FFT) measurement of the HRTEM image of the Pd@PdO/CaSiO$_3$@g-C$_3$N$_4$ nanocomposite material, according to certain embodiments.

A transmission electron microscopy (TEM) image of Pd@PdO/CaSiO$_3$@g-C$_3$N$_4$ nanocomposite is represented in FIG. 3A. The TEM image represents a two-dimensional porous structure constructed with curled and wrinkled nanosheets and platelets of the g-C$_3$N$_4$. The TEM image also shows a good dispersion of large spherical aggregates of metal oxide nanoparticles with a diameter of 103 nanometers (nm) on nanosheets of g-C$_3$N$_4$. The corresponding selected area electron diffraction (SAED) pattern reveals diffraction spots with interplanar spacing of 0.295 nm, 0.220 nm, 0.162, and 0.132 nm due to (CaSiO$_3$: 221, PdO: 100), (CaSiO$_3$: 322), (PdO: 112, CaSiO$_3$: −142), and (PdO: 202, CaSiO$_3$: 823), diffraction planes (FIG. 3B). The inverse fast Fourier transform (IFFT) and fast Fourier transform (FFT) measurements show a d value of 0.23 nm given to the Pd@PdO/CaSiO$_3$/g-C$_3$N$_4$ nanocomposite, which correspond to the lattice spacing of (004) indicating the development of CaSiO$_3$, respectively (FIGS. 3C-3D).

Figure 4A:
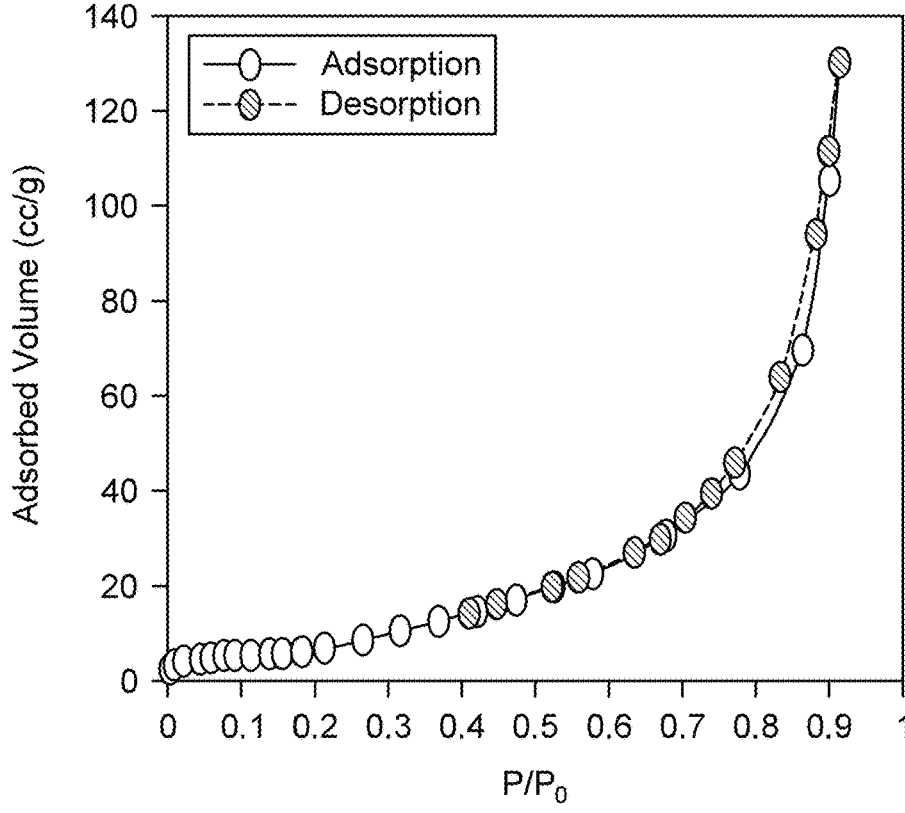
FIG. 4A shows N$_2$ adsorption-desorption isotherms of the Pd@PdO/CaSiO$_3$@g-C$_3$N$_4$ nanocomposite material, according to certain embodiments.
Figure 4B:
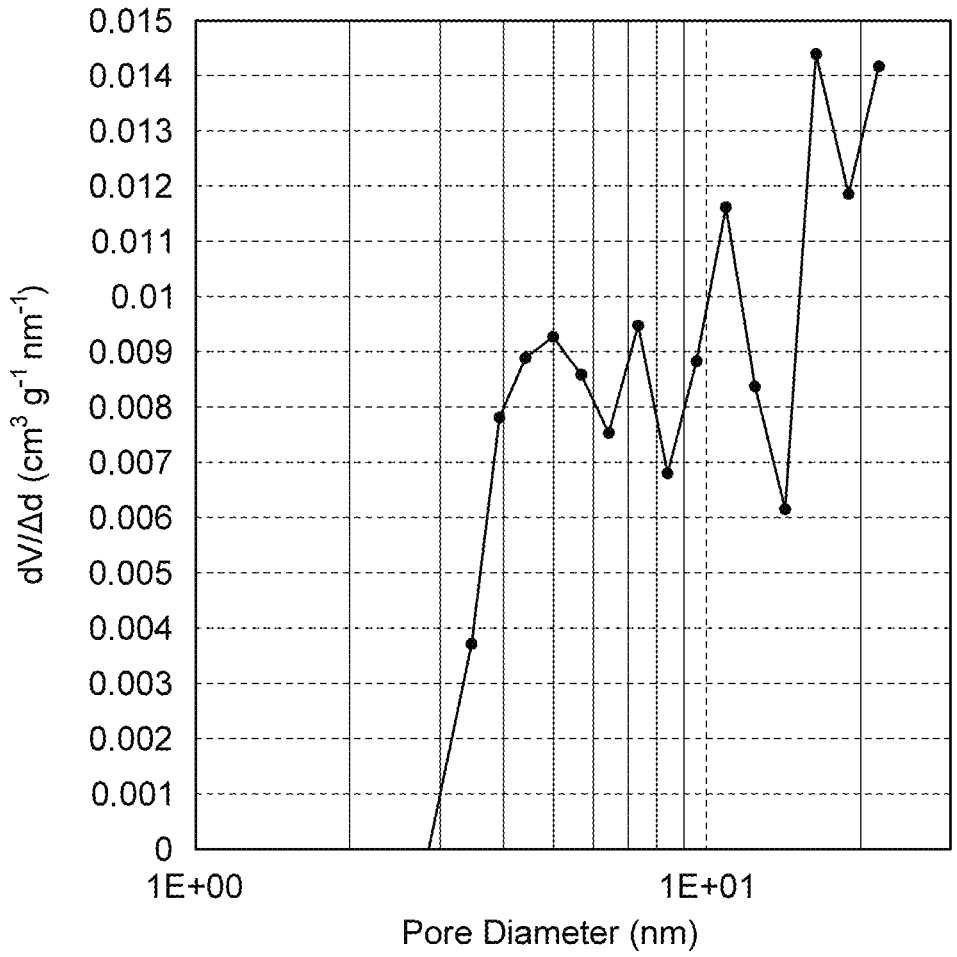
FIG. 4B shows the pore size distribution curves for the Pd@PdO/CaSiO$_3$@g-C$_3$N$_4$ nanocomposite material, plotted using the Barrett-Joyner-Halenda (BJH) method, according to certain embodiments.

FIG. 4A displays the nitrogen adsorption-desorption isotherms of the Pd@PdO/CaSiO$_3$@g-C$_3$N$_4$ nanocomposite. The nitrogen sorption isotherm of the nanocomposite belongs to a type IV hysteresis loop, indicating the formation of mesoporous structures. However, shifting the loop to a relatively higher pressure (relative pressure (P/P$_0$)=0.70-1) indicates the presence of wide mesopores, which may result from the deposition of metal oxide particles in the wide pores of g-C$_3$N$_4$. Furthermore, the Brunauer-Emmett-Teller (BET) surface area of the Pd@PdO/CaSiO$_3$@g-C$_3$N$_4$ nanocomposite material was calculated to be 56.8 square meters per gram (m$^2$ g$^{-1}$). The high specific surface area reflects the good dispersion of these metal oxide nanoparticles on g-C$_3$N$_4$. Moreover, the pore size distribution curves, plotted using the Barrett-Joyner-Halenda (BJH) method for the Pd@PdO/CaSiO$_3$@g-C$_3$N$_4$ nanocomposite material (FIG. 4B), exhibited an unimodal distribution with average pore diameters maximized at 16.39 nm and pore volume of 0.205 cubic centimeters per gram (cm$^3$ g$^{-1}$). All the isotherms belong to the H$_3$ category of pores, which do not exhibit limiting adsorption at high P/P$_0$, and arise due to aggregation of plate-like particles, giving rise to slit-shaped pores. This indicates that the assembly of Pd@PdO/CaSiO$_3$@g-C$_3$N$_4$ nanocomposite produced a mesoporous structure.

Numerous modifications and variations of the present disclosure are possible in light of the above teachings. It is therefore to be understood that within the scope of the appended claims, the disclosure may be practiced otherwise than as specifically described herein.

The invention claimed is:

1. A Pd@PdO/CaSiO$_3$@g-C$_3$N$_4$ nanocomposite material, including:
    spherical metal oxide nanoparticles including a palladium@palladium oxide (Pd@PdO) phase and a calcium silicate (CaSiO$_3$) phase dispersed on a matrix of graphitic carbon nitride (g-C$_3$N$_4$) nanosheets,
    wherein the spherical metal oxide nanoparticles have an average particle diameter in a range from 25 to 250 nanometers (nm), and
    wherein the Pd@PdO/CaSiO$_3$@g-C$_3$N$_4$ nanocomposite material has a Brunauer-Emmett-Teller (BET) surface area of at least 45 square meters per gram (m$^2$·g$^{-1}$).

2. The Pd@PdO/CaSiO$_3$@g-C$_3$N$_4$ nanocomposite material of claim 1, wherein the Pd@PdO/CaSiO$_3$@g-C$_3$N$_4$ nanocomposite material has a BET surface area of at least 50 m$^2$·g$^{-1}$.

3. The Pd@PdO/CaSiO$_3$@g-C$_3$N$_4$ nanocomposite material of claim 2, wherein the Pd@PdO/CaSiO$_3$@g-C$_3$N$_4$ nanocomposite material has a BET surface area of at least 55 m$^2$·g$^{-1}$.

4. The Pd@PdO/CaSiO$_3$@g-C$_3$N$_4$ nanocomposite material of claim 1, wherein the Pd@PdO/CaSiO$_3$@g-C$_3$N$_4$ nanocomposite material has a pore volume of at least 0.10 cubic centimeters per gram (cm$^3$·g$^{-1}$).

5. The Pd@PdO/CaSiO$_3$@g-C$_3$N$_4$ nanocomposite material of claim 4, wherein the Pd@PdO/CaSiO$_3$@g-C$_3$N$_4$ nanocomposite material has a pore volume of at least 0.15 cm$^3$·g$^{-1}$.

6. The Pd@PdO/CaSiO$_3$@g-C$_3$N$_4$ nanocomposite material of claim 5, wherein the Pd@PdO/CaSiO$_3$@g-C$_3$N$_4$ nanocomposite material has a pore volume of at least 0.2 cm$^3$·g$^{-1}$.

7. The Pd@PdO/CaSiO$_3$@g-C$_3$N$_4$ nanocomposite material of claim 1, wherein the Pd@PdO/CaSiO$_3$@g-C$_3$N$_4$ nanocomposite material has an average pore diameter of 16.39 nm.

8. The Pd@PdO/CaSiO$_3$@g-C$_3$N$_4$ nanocomposite material of claim 1, wherein the spherical metal oxide nanoparticles have an average particle diameter in a range from 50 to 150 nm.

9. The Pd@PdO/CaSiO$_3$@g-C$_3$N$_4$ nanocomposite material of claim 8, wherein the Pd@PdO/CaSiO$_3$@g-C$_3$N$_4$ nanocomposite material has a mass ratio of the Pd@PdO: CaSiO$_3$:g-C$_3$N$_4$ phases in a range from 0.1-15:0.1-15:0.1-15.

10. A method for making the Pd@PdO/CaSiO$_3$@g-C$_3$N$_4$ nanocomposite material of claim 1, including:
    autoclaving a solution including calcium nitrate (Ca(NO$_3$)$_2$), sodium metasilicate (Na$_2$SiO$_3$), and ethanol (C$_2$H$_5$OH) at a temperature from 150 to 210 degrees Celsius (° C.) for 1 to 3 hours (h) to form a first reaction mixture;
    dispersing the first reaction mixture in distilled water, filtering, and rinsing with distilled water to form CaSiO$_3$;
    drying the CaSiO$_3$; at 100 to 140° C. for 1 to 2 h to form a dried CaSiO$_3$;
    heating urea in a crucible at a temperature from 500 to 700° C. for 0.5 to 2 h to form g-C$_3$N$_4$;
    heating a reactive solution comprising palladium chloride (PdCl$_2$), xylose, and nitric acid (HNO$_3$) at 100 to 140° C. for 2 to 4 h to form a Pd intermediate;
    calcining the Pd intermediate at a 500 to 600° C. for 3 to 5 h to form Pd@PdO;
    dispersing the dried CaSiO$_3$, g-C$_3$N$_4$, and Pd@PdO in ethylene glycol monomethyl ether to form a second reaction mixture;
    microwaving the second reaction mixture at 160 to 200° C. and 4 to 6 bar pressure for 0.5 to 2 h to form a first intermediate; and
    dispersing the first intermediate in distilled water, filtering, rinsing with distilled water, and drying at 120 to 180° C. for 1 to 4 h to form the Pd@PdO/CaSiO$_3$@g-C$_3$N$_4$ nanocomposite material.

11. The method of claim 10, wherein the concentration of Ca(NO$_3$)$_2$ in the first reaction mixture is in a range from 0.1 to 10 g/L.

12. The method of claim 10, wherein the concentration of Na$_2$SiO$_3$ in the first reaction mixture is in a range from 0.1 to 10 g/L.

13. The method of claim 10, wherein the concentration of ethanol in the first reaction mixture is in a range from 400 to 600 milliliters per litre (mL/L).

14. The method of claim 10, wherein the urea is heated in the crucible at a temperature of 600° C. for 45 minutes (min).

15. The method of claim 10, wherein the concentration of PdCl$_2$ in the reactive solution is in a range from 12 to 24 grams per litre (g/L).

16. The method of claim 10, wherein the concentration of xylose in the reactive solution is in a range from 35 to 55 g/L.

17. The method of claim 10, wherein the concentration of HNO$_3$ in the reactive solution is in a range from 80 to 100 mL/L.

18. The method of claim 10, wherein the palladium intermediate is calcined at 550° C. for 4 h to form Pd@PdO.

19. The method of claim 10, wherein the second reaction mixture is microwaved at 180° C. and 5 bar pressure.

20. The method of claim 10, wherein the second reaction mixture is microwaved for 1 h.

\* \* \* \* \*